Figure 1:
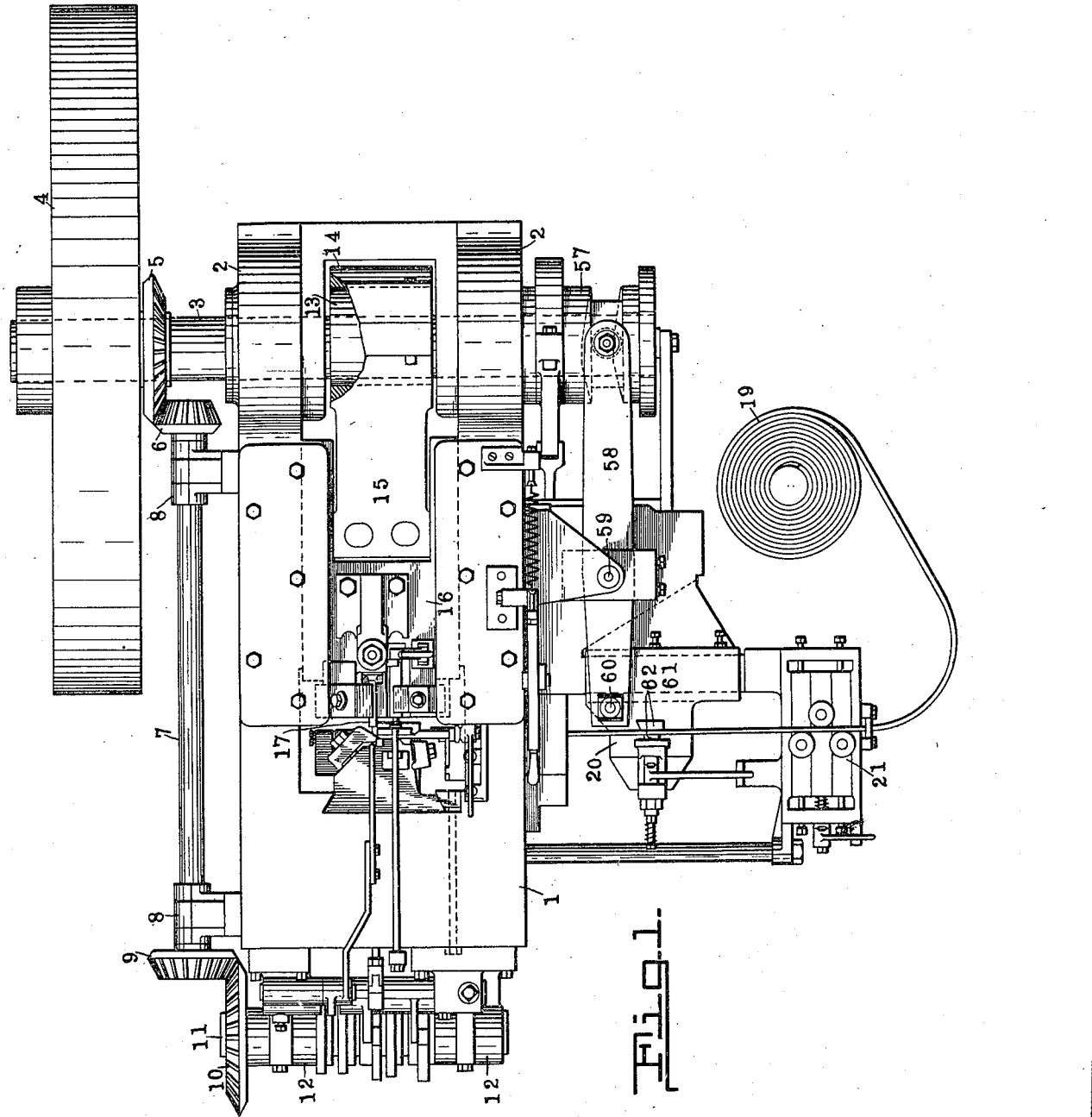

W. L. WARD & E. BURDSALL.
NUT MAKING MACHINE.
APPLICATION FILED MAY 6, 1914.

1,179,481.

Patented Apr. 18, 1916.
3 SHEETS—SHEET 1.

WITNESSES:

INVENTORS
W. L. Ward
E. Burdsall
BY
Duell, Warfield & Duell
ATTORNEYS

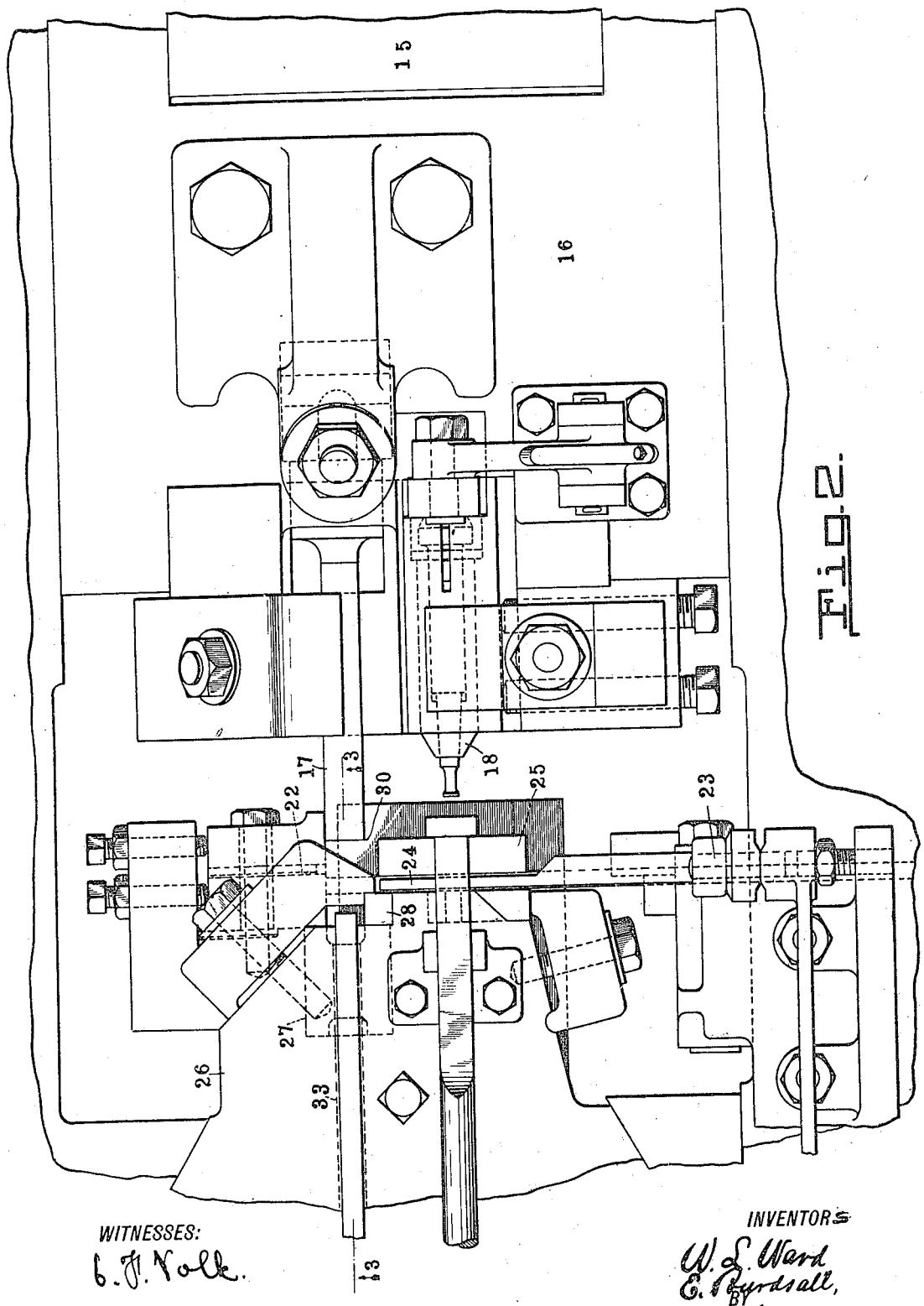

W. L. WARD & E. BURDSALL.
NUT MAKING MACHINE.
APPLICATION FILED MAY 6, 1914.
1,179,481.
Patented Apr. 18, 1916.
3 SHEETS—SHEET 3.
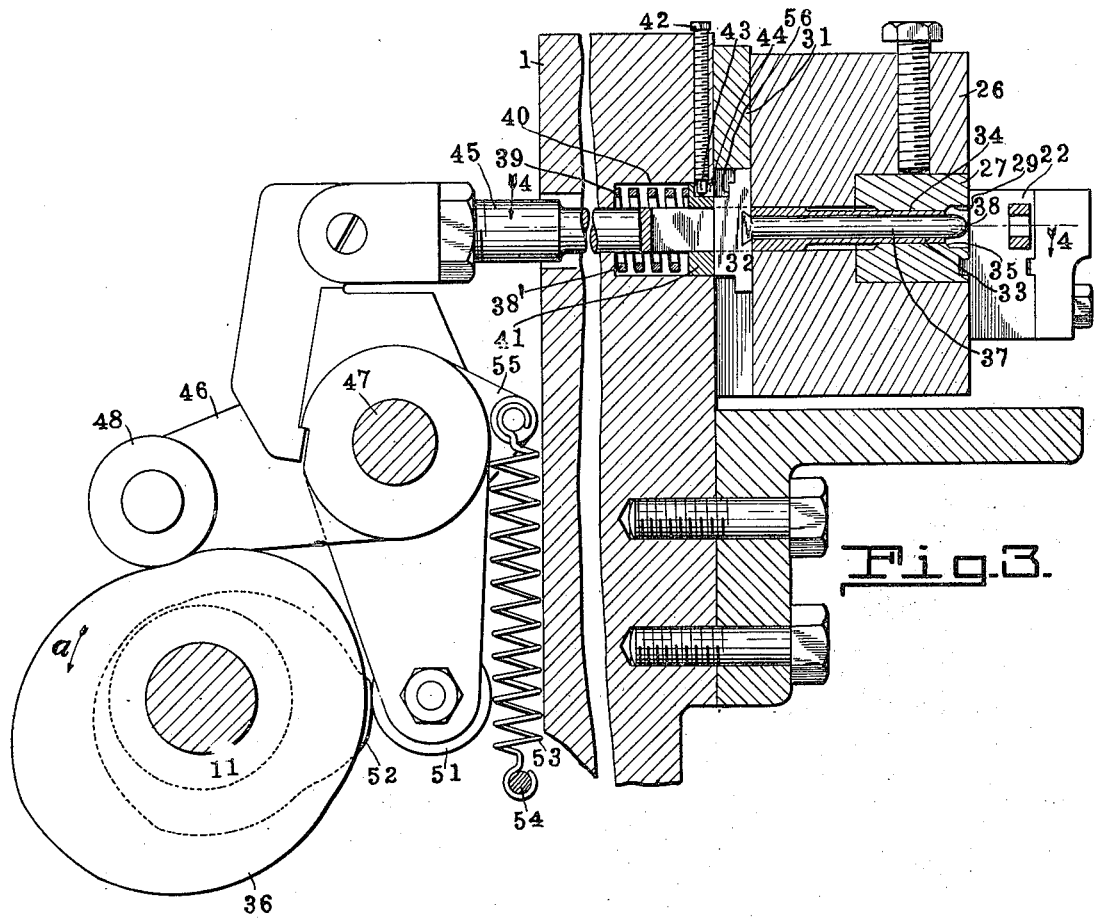
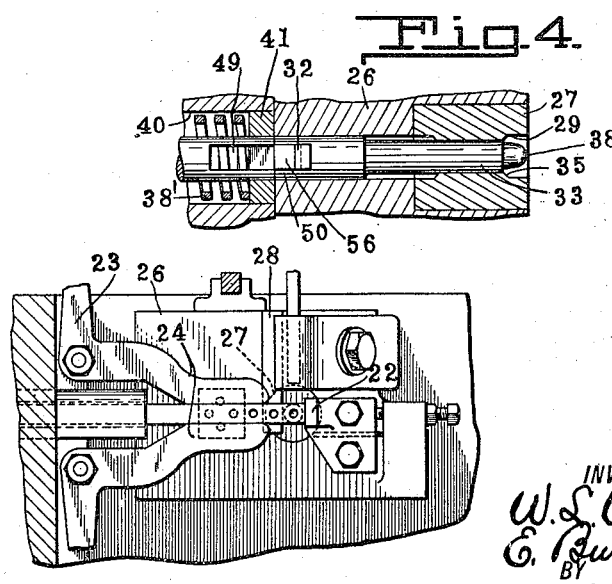
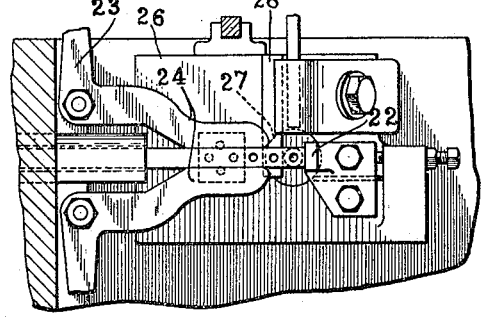
WITNESSES:
C. F. Volk
J. Thomson
INVENTORS
W. L. Ward
E. Burdsall
BY
Dull, Warfield & Dull
ATTORNEYS

UNITED STATES PATENT OFFICE.

WILLIAM L. WARD AND ELLWOOD BURDSALL, OF PORT CHESTER, NEW YORK, ASSIGNORS TO RUSSELL, BURDSALL & WARD BOLT AND NUT CO., OF PORT CHESTER, NEW YORK, A CORPORATION OF NEW YORK.

NUT-MAKING MACHINE.

1,179,481.   Specification of Letters Patent.   Patented Apr. 18, 1916.

Application filed May 6, 1914. Serial No. 836,590.

*To all whom it may concern:*

Be it known that we, WILLIAM L. WARD and ELLWOOD BURDSALL, citizens of the United States, residing at Port Chester, in the county of Westchester and State of New York, have invented certain new and useful Improvements in Nut-Making Machines, of which the following is a full, clear, and exact description, such as will enable others skilled in the art to which it appertains to make and use the same.

This invention relates to metal working machines and with regard to certain more specific features thereof to machines for the production of nuts or nut blanks.

This invention has for one of its objects the provision of simple and practical automatic apparatus for the rapid production of nut blanks.

It is another object of the invention to provide effective means whereby nut blanks may be effectively crowned or cupped and retain their symmetry.

Another object of the invention is the production of nut blanks of great strength.

Still another object is to provide a compact apparatus of comparatively few parts, but with said parts combined to perform a plurality of functions thereby rendering the apparatus cheaper and more rapid.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

To promote a further understanding as to the manner in which this invention may be carried out, drawings exemplifying one of various possible embodiments thereof have been appended as a part of this disclosure and in said drawings like characters of reference denote similar parts throughout the several views of which:

Figure 1 is a plan view of a nut making machine embodying the present invention; Fig. 2 is an enlarged fragmentary plan view of the same; Fig. 3 is a sectional view taken on the line 3—3 of Fig. 2; Fig. 4 is a sectional view taken substantially on the line 4—4 of Fig. 3, and Fig. 5 is an elevational view of the positioning mechanism and dies.

Referring now more particularly to the drawings, there is indicated at 1 the machine frame or bed providing bearings 2 for a main driving shaft 3 driven by a belt on the driving pulley 4. A bevel gear 5 is affixed to the main driving shaft 3 and meshes with the bevel pinion 6 which in turn is fixed on the end of a shaft 7 supported longitudinally of the machine in bearings 8 projecting from the rear of the frame 1. On the opposite end of the shaft 7 there is fixed a bevel gear 9 which meshes with a bevel gear 10 on a cam shaft 11. The shaft 11 is supported in bearings 12 extending from the left end of the machine and carries numerous cams adapted to actuate various working parts of the apparatus. The main driving shaft 3 is provided with an eccentric member 13 which is surrounded by a bearing 14 of a connecting member 15 which is in turn pivoted to a slide 16. By this construction the rotary movement of the shaft 3 is transposed into a reciprocatory movement of the slide 16. The slide 16 carries securely mounted therein a crowning shear punch 17 and a perforating punch 18. A coil of nut blank stock is indicated at 19 and is drawn by means of the feeding mechanism 20 through the straightening device indicated at 21. An adjustable stop 22 (Fig. 2) limits the movement of the stock bar against the action of the feeding means 20 and by reason of the coöperation of these two last mentioned mechanisms a portion of the stock bar is brought into operative position opposite the reciprocatory punch members 17 and 18. Positioning means are indicated at 23 comprising a pair of movable fingers 24 adapted to bear respectively against opposite longitudinal edges of the stock bar, and a clamp 25 is adapted to be actuated intermittently to hold a portion of the stock bar firmly in position to be operated upon by the punches. A die block supporting member 26 is secured in the bed or frame of the machine in any suitable manner and is adapted to support and hold a crowning-die block 27. A shearing member 28 is fixedly supported relative to the crowning punch 17 and its coöperating crowning die 29, and this shearing member is adapted to coact with a shearing edge 30 of the punch 17 to sever a section of the stock bar as the punch moves forward in its operative direction of reciprocation. The die block supporting member 26 is vertically recessed, as indicated at 31, to accommodate a plate 32.

A sleeve plunger 33 is supported for longitudinal movement with the member 26 and extends through an opening 34 in the crowning die block 27. The end of this plunger 33 normally rests substantially flush with the head 35 of the crowning die 29, but it is adapted to be actuated by the cam 36 on the shaft 11 through intermediate mechanism which will be hereinafter described, to cause the end of the plunger 33 to advance through the crowning die 29 toward the reciprocatory punch member 17. Through the bore in the sleeve member 33 there extends a cylindrical stud 37. One end of this stud is dovetailed into the plate 32 and at the opposite end a portion of the stud is adapted to normally project beyond the end of the sleeve 33 when the latter occupies its normal position. It will be seen that this brings the said opposite end beyond the head 35 of the crowning die and opposite the lateral walls 38 of said die. This projecting portion is slightly tapered from its largest diameter adjacent the head 35 of the die to a slightly smaller diameter at the extreme end of the stud. It will be obvious of course that this stud is adapted to penetrate the sheared nut blank through the perforation or bolt opening therein. It will be equally obvious that unless the nut blank be properly positioned to present the bolt opening opposite the stud the blank might be jammed by reason of the pressure of the crowning punch and would not receive the desired shaping. It is one of the purposes of the taper on the end of the stud 37 to aid the sheared nut blank in centering itself in the crowning die, but if for any reason this centering is not obtained the stud 37 is adapted to yield against the action of a substantially strong spring 38', one end of which bears against a wall 39 of a chamber 40 formed in the frame 1, and the other end of which bears against a loose collar 41 which in turn abuts the plate 32 hereinbefore described. A screw 42 is passed from the upper surface of the frame 1 through said frame and provides a projecting portion 43 of somewhat reduced diameter which loosely engages the collar 41 in a slot 44. One of the purposes of this screw is to prevent the spring from forcing the collar 41 out of the chamber 40 in the event that the die block supporting member 26 is removed from the machine. An actuating plunger 45 is mounted on a cam roll carrying lever 46 which fulcrums on a shaft 47, said shaft being mounted in suitable brackets on the frame 1. The lever 46 carries a cam roll 48 which coacts with the cam 36 as the latter travels in the direction of the arrow "$a$" causing the plunger 45 to advance. It is to be noted that the end of the plunger 45 is bifurcated, as indicated at 49, to permit the movement thereof opposite the plate 32. The sleeve 34 is likewise bifurcated, as indicated at 50, for the same reason. When the sleeve 34 is in its retracted position the bifurcated end thereof abuts the bifurcated end of the plunger 45 so that as the latter is advanced by the cam 36 the sleeve 34 will be advanced and will eject a nut blank from the die 29 also stripping the nut blank from the projecting end of the stud 37. The lever 46 also carries a cam roll 51 which is actuated to retract the plunger 45 by the cam 52. It is of course obvious that if the plunger 45 was advanced and the sleeve 34 projected into or through the die 29, an incoming nut blank carried by the crowning shear punch 17 would immediately cause the plunger to be retracted. A spring 53 has its lower end connected to the frame 1 by means of a pin 54 and its upper end engages a lug 55 on the lever 46. This spring has a tendency to advance the plunger 45. As the punch 17 shears a nut blank from the stock bar it is desirable to have some means to grip the blank to insure the same being carried centrally into the die 29. The sleeve 34 is therefore advanced at this time and the cam 52 is provided with a retreat which causes the cam roll 51 to float for a certain period of rotation allowing the spring 53 to operate to spring press the sleeve 33 through the medium of the plunger 45 against the crowning face of the incoming sheared nut blank. It will be noted therefore that the blank is securely frictionally gripped while being moved into the die 29. The plate 32 is recessed at 56 to permit same to have a slight amount of movement into the frame 1 following the collar 41 and against the action of the spring 38'. The perforating punch 18 moves simultaneously with the crowning punch 17 and at a distance away from the said crowning punch, which distance is an exact multiple of the length of the nut blank. It operates to perforate the stock bar to provide a bolt opening therein. During this perforating operation the stock bar is securely held against vertical movement by reason of the positioning fingers 24, and it is also held against lateral or longitudinal movement by reason of the clamping mechanism 25. The lateral walls of the crowning die 29 are adapted to closely fit the lateral walls of the incoming nut blanks and the diameter of the stud 37 for a portion of the length of its projecting end substantially corresponds to the diameter of the bolt opening so that when the nut blank has been sheared from the stock bar and is forced into the crowning die and against the crowning head 35, said blank is reinforced on the inside by the stud 37 as well as on the outside by the lateral walls of the die chamber. The crowning operation results then substantially in a compression of the stock increasing the density of the finished nut and by reason of the fact that the bolt opening is reinforced while the blank is being crowned the symmetry of this opening is retained and the necessity of repunching or retrimming either the bolt opening or the exterior lateral walls of the nut is obviated.

It is believed that the operation of this machine will be clear from the foregoing. However, a brief description of the operation is as follows: The stock bar is placed in the form of a coil upon a suitable support adjacent the machine. One end of the bar is then led through the straightening device 21 through the feeding device 20 and through the positioning device 23 opposite the clamp 25. The machine is then started, the driving shaft 3 operating through a barrel cam 57 to actuate a lever 58 which is fulcrumed, as indicated at 59, and pivoted at 60, to a reciprocatory translating device 61. This device comprises gripper members 62 which operate to close during the rearward leg of the reciprocation and to open when returning. The whole provides an intermittent feed substantially the length of a nut blank with a period of dwell between each feeding reciprocation to allow for the crowning perforating and ejecting of the nut blank. The stock bar is accordingly fed against the stop 22 where upon reciprocation of the punch 17 a nut blank is severed therefrom and carried into the die chamber where it is crowned by reason of its being pressed against the crown shaped head of the die. Practically simultaneously upon the same reciprocation of the slide 16 which shears and crowns the nut blank, the perforating punch operates to provide a bolt opening in the stock bar. As the punch 17 retreats the sleeve 34 is advanced and ejects the crowned nut blank from the machine. In the event that the sheared nut blank has not been perforated or has not been properly perforated, or if for any reason the bolt opening becomes so far off center that it cannot be properly centered by the taper of the projecting end of the stud 37, the said stud will yield against the action of the spring 38' in a manner which has been hereinbefore described, and after the defective nut has been crowned the sleeve 34 will operate in the usual way to eject the nut and immediately the pressure of the punch 17 is relieved from the plunger 37, the latter will return to its normal position with a portion of its length extending opposite the lateral walls of the die chamber.

From the foregoing it will be seen that an apparatus is provided which produces a substantially finished nut blank in which retrimming or repunching is not necessary. The nut produced is substantially stronger than an ordinary nut for the reason that crowning causes a compression of the metal.

Having described our invention, what we claim as new and desire to secure by Letters Patent is:

1. In apparatus of the character described, in combination, means adapted simultaneously to cut a bolt opening in a stock bar and sever a nut blank from said bar, means adapted to crown the severed nut blank, and means adapted to reinforce the severed nut blank on all inner and outer sides when being crowned.

2. In an apparatus of the character described, in combination, means adapted to reshape a nut-blank comprising a die having rigid lateral reinforcing walls and a reshaping head, and yielding means adapted to penetrate the bolt opening of said nut-blank to reinforce the blank therein while said nut is being reshaped.

3. In an apparatus of the character described, in combination, means adapted to crown a nut-blank, and means adapted substantially to prevent expansion of the material in said nut-blank outwardly and inwardly into the bolt opening thereof while said blank is being crowned comprising a spring pressed stud.

4. In an apparatus of the character described, in combination, means adapted to crown a nut-blank, and means adapted substantially to prevent expansion of the material in the crown portion of said nut-blank outwardly and inwardly into the bolt opening thereof while said blank is being crowned comprising a yielding stud.

5. In an apparatus of the character described, in combination, means adapted to crown a nut-blank, comprising a crowning die having rigid lateral walls and a reshaping head, means independently movable with respect to the crowning die adapted to eject a nut-blank therefrom, and means associated with said die adapted to penetrate the bolt opening to preserve the shape thereof while the nut is being crowned.

6. In an apparatus of the character described, in combination, means adapted to crown a nut-blank, comprising a crowning die having rigid lateral walls and a reshaping head, means independently movable with respect to the crowning die adapted to eject a nut-blank therefrom and coöperate with part of said crowning means to carry the blank into the die, and means associated with said die adapted to penetrate the bolt opening to preserve the shape thereof while the nut is being crowned.

7. In an apparatus of the character described, in combination, means adapted to reshape a nut-blank, comprising a die and a punch, a member having relative movement with said die adapted to move the nut-blank away from said die and assist in moving said nut-blank toward said die, and means adapted substantially to prevent expansion of the material of the nut-blank into the bolt opening thereof while reshaping.

8. In an apparatus of the character described, in combination, a nut-blank crowning die, a bolt opening engaging stud normally spring pressed against relative movement with said die and providing a portion extending into the bolt opening of a nut-blank as the latter is being crowned, a crowning punch adapted to press a nut-blank into said die for crowning, and a movable sleeve adapted to advance over said stud to discharge a blank and coöperate with said punch to grip a blank and carry the same into said die.

9. In an apparatus of the character described, in combination, a nut-blank crowning die comprising a head and rigid lateral walls adapted to closely fit a nut-blank, a nut-blank crowning punch, a movable member adapted to advance to discharge a blank from said die and adapted to coöperate with said punch to resiliently grip a blank as the same is carried by said punch into crowning position, a bolt opening engaging member normally held by means of a spring in position to engage the blank through its bolt opening, and means whereby said engaging member may retreat to the head of said crowning die.

In testimony whereof we affix our signatures in the presence of two witnesses.

WILLIAM L. WARD.
ELLWOOD BURDSALL.

Witnesses:
R. H. BURDSALL,
HOWARD E. MARSHALL.